US006054399A

United States Patent [19]

Lebold et al.

[11] Patent Number: 6,054,399

[45] Date of Patent: Apr. 25, 2000

[54] FLUOROCARBON PARTICLE COATED TEXTILES FOR USE IN ELECTROSTATIC PRINTING MACHINES

[75] Inventors: Alan R. Lebold, Niagara Falls, N.Y.; Alan Smithies, Evans, Ga.; Edward D. Andrew, Blackburn, United Kingdom

[73] Assignee: BMP America, Inc., Medina, N.Y.

[21] Appl. No.: 09/014,288

[22] Filed: Jan. 27, 1998

Related U.S. Application Data

[60] Provisional application No. 60/034,847, Jan. 27, 1997.

[51] Int. Cl.[7] .............................. B32B 27/00; B32B 9/00

[52] U.S. Cl. .............................. 442/98; 442/92; 442/168; 428/143; 428/147; 428/421; 428/422

[58] Field of Search ................................. 442/98, 92, 94, 442/168, 294; 428/147, 143, 422, 421

[56] References Cited

U.S. PATENT DOCUMENTS

| | | | |
|---|---|---|---|
| 3,155,566 | 11/1964 | Fisher | 442/98 |
| 4,232,087 | 11/1980 | Trask . | |
| 4,324,482 | 4/1982 | Szlucha . | |
| 4,615,933 | 10/1986 | Traut . | |
| 5,045,890 | 9/1991 | Debolt et al. . | |
| 5,123,151 | 6/1992 | Uehara et al. . | |
| 5,232,499 | 8/1993 | Kato et al. . | |
| 5,327,203 | 7/1994 | Rasch et al. . | |
| 5,478,423 | 12/1995 | Sassa et al. . | |
| 5,534,062 | 7/1996 | Dawson et al. . | |
| 5,690,739 | 11/1997 | Sassa et al. . | |
| 5,709,748 | 1/1998 | Sassa et al. . | |

FOREIGN PATENT DOCUMENTS

| | | |
|---|---|---|
| WO93/08512 | 4/1993 | European Pat. Off. . |

OTHER PUBLICATIONS

Dupont Technical Bulletin No. X–50G "Teflon–PTFE Dispersions Properties and Processing Techniques" Apr. 1983.

*Primary Examiner*—Daniel Zirker
*Attorney, Agent, or Firm*—Jones, Tullar & Cooper, P.C.

[57] ABSTRACT

A textile material whose fibers have been coated, at least in part, with fluorocarbon particles is usable in an electrophotographic printing machine to clean toner particles off a fuser roll, and to supply a toner release agent to the fuser roll. The textile material can include woven goods, as well as nonwoven felts and the like. The resultant product has reduced friction and decreased fiber shedding.

8 Claims, 1 Drawing Sheet

FLUOROCARBON PARTICLE COATED TEXTILES FOR USE IN ELECTROSTATIC PRINTING MACHINES

CROSS-REFERENCE TO RELATED APPLICATION

The subject patent application claims the benefit of U.S. Provisional Application No. 60/034,847, which was filed on Jan. 27, 1997. The disclosure of that provisional patent application is hereby incorporated herein by reference.

FIELD OF THE INVENTION

The present invention is directed generally to fluorocarbon particle coated textiles for use in electrostatic printing machines. More particularly, the present invention is directed to fluorocarbon particle coated textiles for use to clean toner particles off a fuser roll in an electrostatic printing machine. Most specifically, the present invention is directed to the use of a polytetrafluoro-ethylene particle coated textile material to clean toner particles off a fuser roll and to deliver oil as a toner release agent in an electrostatic printing machine. The fluorocarbon particles are applied to the textile fabric, which can include woven goods, as well as non-woven textiles. These fluorocarbon particle coated textiles utilize the particle retaining interstices inherent with textiles, while retaining the reduced frictional characteristics of fluorocarbon membrane coated fabric.

DESCRIPTION OF THE PRIOR ART

In the field of electrostatic printing it is well known to record a latent electrostatic image on a photosensitive member with subsequent rendering of the image visible by the application of electrostatic marking particles, typically referred to as toner. The visual image is then transferred from the photosensitive member to a sheet of paper with subsequent affixing of the image onto the paper.

To fix or fuse the toner onto the paper permanently by heat, the temperature of the toner is elevated to a point at which the constituents of the toner coalesce and become tacky. This causes the toner to flow to some extent onto the fibers or pores of the paper. Thereafter, as the toner cools, solidification of the toner occurs thus causing the toner to be bonded firmly to the paper.

One procedure for accomplishing the thermal fusing of toner images onto the paper has been to pass the paper with the unfused toner images thereon between a pair of opposed roller members at least one of which is internally heated. This heated roller is typically referred to as a fuser roll. During operation of a fusing system of this type, the paper to which the toner images are electrostatically adhered is moved through the nip formed between two rolls with the toner image contacting the heated fuser roll to thereby effect heating of the toner images within the nip. Typically these fusing systems contain two rolls one of which is the heated fusing roll, the other of which is a compression roll. The fusing roll is typically coated with a compliant material, such as silicone rubber, other low surface energy elastomers, or tetrafluoroethylene resin sold by E. I. DuPont De Nemours under the trademark TEFLON.

One drawback of these fusing systems is that since the toner image is tackified by heat, it frequently happens that a part of the image carried on the paper is retained by the heated fuser roll rather than penetrating the paper's surface. This tackified toner often sticks to the surface of the fuser roller and then gets deposited onto the following paper or onto the mating pressure roller. This depositing of toner onto the following paper is known as "offsetting". Offsetting is an undesirable event which lowers the sharpness and quality of the immediate print as well as contaminating the following prints with toner.

To alleviate the toner offsetting problem, it is a common practice to utilize toner release agents such as silicone oils which are applied to the fuser roll surface to act as a toner release material. These materials posses a relatively low surface energy and are suitable for use in the heated fuser roll environment. In practice, a thin layer of silicone oil is applied to the surface of the heated fuser roll to form an interface between the fuser roll surface and the toner image carried on the support material, typically paper. Thus, a low surface energy, easily parted layer is presented to the toners that pass through the fuser roll nip and thereby prevents toner from adhering to the fuser roll surface.

Numerous systems have been used to deliver release agent fluid to the fuser roll. Typically these prior art systems incorporate a textile as the oil, or similar release agent fluid, holding and delivery medium. These textiles also serve a critical roll in that they are utilized as a fuser cleaning mechanism. With each iteration of the fuser's rotation, there may be some non-released toner particles remaining on the fuser's surface. These non-released particles are then captured in the interstices of the textile's fibers during the completion of the rotation or during the following iteration.

The most commonly used textile in today's electrophotographic or electrostatic printing machines is that which is known as a needle felt. Suitable needle felts are, for example, sold by Andrew Textile Industries Limited or Southern Felt Company Incorporated. Other textiles include those known as thermal bonded non-wovens, hydroentangled non-wovens, and wovens. Most of the textiles used in electrophotographic or electrostatic printing machines are typically made with some content of Aramid fibers such as those sold by E. I. DuPont De Nemours under the trademark NOMEX. Some of these textiles also have some content of polyester. The textiles are typically impregnated with a silicone oil such as that sold by the Dow Corning Corporation. Many of these silicone oil impregnated textiles are manufactured at BMP America Incorporated located in Medina, N.Y. or at BMP Europe Limited located in Accrington, Lancashire, United Kingdom.

Although most application's requirements have been met by these prior art oil impregnated textiles, some issues continue to exist with these materials. Under certain conditions these materials can cause more frictional drag than is desirable in the application. This frictional drag can create a slow erosion of the silicone rubber fuser roll, thereby leading to decreased life of the fuser roll. Also, under certain conditions, these textile materials have shown some degree of fiber shedding or loosening. This fiber shedding or loosening is undesirable in that the released fibers may be a source of contamination which can decrease print quality, create mechanical jams, and act as nucleation sites for accelerated contamination build-up. Accelerated contamination build-up can lead to premature blockage of oil delivery from the textile to the fuser roll.

In an effort to overcome some of these issues with prior art materials, textile products have been laminated to Polytetrafluoroethylene (PTFE) membranes, such as those available from the W. L. Gore company under the trade name of GORE-TEX. The textile/PTFE membrane laminate is positioned into an electrophotographic or electrostatic printing machine with the PTFE membrane placed against the fuser roll. These textile/PTFE membrane laminates do, under certain conditions, decrease the frictional drag forces and do decrease the fiber shedding.

Although the textile/PTFE membrane laminate addresses fiber shedding and, under certain conditions, lowers frictional drag forces, there exists a new set of problems with these products. Firstly, the membranes tend to be very smooth and thus lose the capability to readily capture contaminates such as fused toner particles and paper dust as can be done by the interstices of a textile which has not been laminated with a PTFE membrane. This is a well recognized problem in the industry. To address this issue membrane manufactures have mechanically embossed the membrane via passage through embossing rollers, or have utilized spray deposition of PTFE upon textured processing surfaces. Some have not altered the PTFE membrane's smooth surface but have added separate cleaning or scraping devices to the electrophotographic or electrostatic printing machine. Such cleaning or scraping devices are known in the industry as doctor blades. All of these texturing and cleaning techniques add cost to what is already a much more costly material than the textiles that traditionally exist in these applications.

Cost is a second problem that exists with the textile/PTFE membrane laminates. Pricing of the textile/PTFE membrane laminate systems can be 10 times the cost of the traditional textiles. The pricing is higher due to the fact that PTFE membrane is a more costly raw material than aramids and polyesters. Cost is also driven up by the number of processes involved in producing a textile/PTFE membrane laminate. These processes include producing a textile, producing a PTFE membrane, surface texturing of membrane, and then lamination of the membrane to the textile. Again, in certain cases, an additional cleaning device such as a doctor blade is required to meet the application's requirements. This additional device also adds cost.

It will thus be seen that a need exists for a textile that is usable to clean fuser rolls in electrostatic printing machines, while avoiding the limitations of the prior art. The fluorocarbon particle coated textiles for use in electrostatic printing machines, in accordance with the present invention overcome the limitations of this prior art and are a significant improvement over the prior art.

SUMMARY OF THE INVENTION

It is an object of the present invention to provide a fluorocarbon particle coated textile for use in an electrostatic printing machine.

Another object of the present invention is to provide a fluorocarbon particle coated textile to clean toner particles off a fuser roll in an electrostatic printing machine.

A further object of the present invention is to provide a fluorocarbon particle coated textile to remove toner particles from a fuser roll and to deliver oil as a toner release mechanism, in an electrostatic printing machine.

Still another object of the present invention is to provide a polytetrafluoroethylene particle coated textile, having interstices, for cleaning a fuser roll in an electrostatic printing machine.

As will be discussed in detail in the description of the preferred embodiment, which is presented subsequently, the present invention utilizes a textile material, which has been coated with fluorocarbon particles, to clean toner particles off a fuser roll in an electrostatic printing machine. The textile material can be a woven fabric or one of the generally known non-woven textiles. The fluorocarbon particles are typically polytetrafluoroethylene, (PTFE) and are applied to the textile fabric in a manner which preserves the intersticial characteristics of the textile. In use, the fluorocarbon particle coated textile fabric acts as an effective fuser roll cleaner since it is capable of both removing and holding removed toner particles, as well as delivering a toner release agent, such as silicone oil, to the fuser roll.

The present invention gains some of the advantages of a prior art PTFE membrane coated textile while avoiding the disadvantages of a PTFE membrane coated textile. The advantages gained are decreased fiber shedding, which leads to decreased fiber contamination, and lower frictional drag forces, which lead to decreased component wear.

Several disadvantages of the prior art PTFE membrane coated textile for use in an electrophotographic or electrostatic machine application are avoided by use of a fluorocarbon particle coated textile in an electrophotographic machine application in accordance with the present invention. A fluorocarbon particle coated textile preserves the textile's interstices to thus maintain the textile's inherent toner capturing and cleaning capability, without significantly reducing the oil delivery capacity of the original textile. A prior art PTFE membrane coated textile eliminates the textile's interstices from coming in contact with contaminates and toner for the purpose of collecting and cleaning. Also, a prior art PTFE membrane severely restricts oil flow through the textile. Fluorocarbon particle coated textiles, in accordance with the present invention, only moderately lower the oil flow through the textile. Another advantage of a fluorocarbon particle coated textile is that its application advantages are accomplished at a cost well below that of prior art textile/PTFE membrane laminates. The direct adherence of fluorocarbon particles avoids some of the cost of textile/PTFE membrane laminates through a decreased number of processing steps and through decreased raw material expenses.

The fluorocarbon particle coated textile fabrics for use in electrostatic printing machines in accordance with the present invention, overcome the limitations of the prior art. The invention is a substantial advance in the art.

BRIEF DESCRIPTION OF THE DRAWINGS

While the novel features of the fluorocarbon particle coated textiles for use in electrostatic printing machines in accordance with the present invention will be set forth with particularity in the appended claims, a full and complete understanding of the invention may be accomplished by referring to the detailed description of the preferred embodiment, which is presented subsequently, and as illustrated in the accompanying drawings, in which:

DETAILED DESCRIPTION OF THE PREFERRED EMBODIMENT

Figure 1:
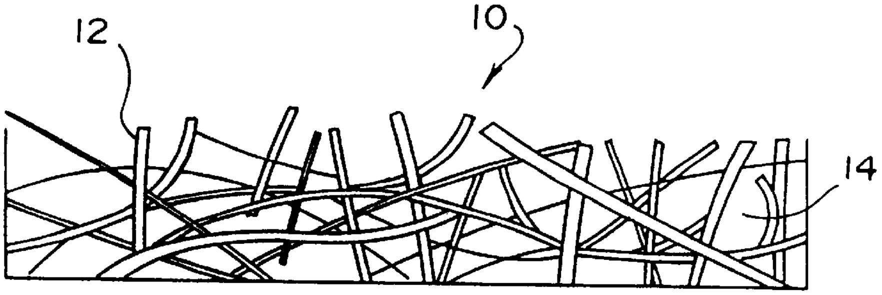
FIG. 1 PRIOR ART
FIG. 1 is a schematic enlarged cross-sectional view of a an uncoated upper surface of a textile fabric in accordance with the prior art.

Referring initially to FIG. 1, there may be seen, generally at 10 a magnified cross-sectional view of a prior art uncoated textile fabric for use in electrostatic printing machines. The textile fabric 10 is formed by a plurality of fibers 12 which are either woven or non-woven, as will be discussed in detail shortly. These fibers 12 define interstices or spaces 14. The number and size of these interstices 14 will vary with the specific type of textile. It is these interstices 14 which serve as collecting areas for toner particles removed from a fuser roll in an electrostatic printing machine, and which also serve as receptacles for suitable toner release agents, such as silicone oils that are transferred to the fuser roll from the textile 10.

Figure 2:
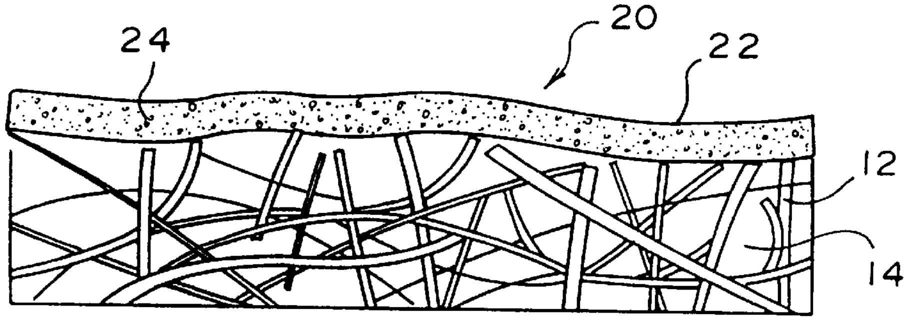
FIG. 2 PRIOR ART
FIG. 2 is a schematic enlarged cross-sectional view of an upper portion of a textile laminated to a polytetrafluoroethylene membrane also in accordance with the prior art.

As may be seen in FIG. 2, which is a depiction of a prior art arrangement, there is depicted, generally at 20, a polytetrafluoroethylene (PTFE) membrane coated textile. The textile of this prior art arrangement has the same fibers 12 and interstices 14 as depicted in FIG. 1. However these fibers 12 and interstices are covered by a PTFE membrane 22. This membrane 22 effectively closes the openings to the interstices 14 between the fiber strands 12. Although the membrane 22 has microporous openings 24, these tend to be below 1 micron in size and are thus too small to facilitate the collection of toner particles that are typically above 3 microns in size. These microporous openings 24 are also very restrictive of the flow of toner release agents, such as silicone oils that may be held in the interstices 14 of the prior art PTFE membrane coated textile 20.

Figure 4:
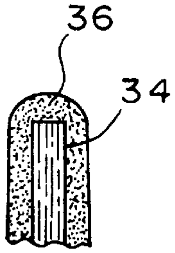
FIG. 4 is a further enlarged schematic cross-sectional view of the encircled portion of FIG. 3 and showing a fluorocarbon particle coated fiber.
Figure 3:
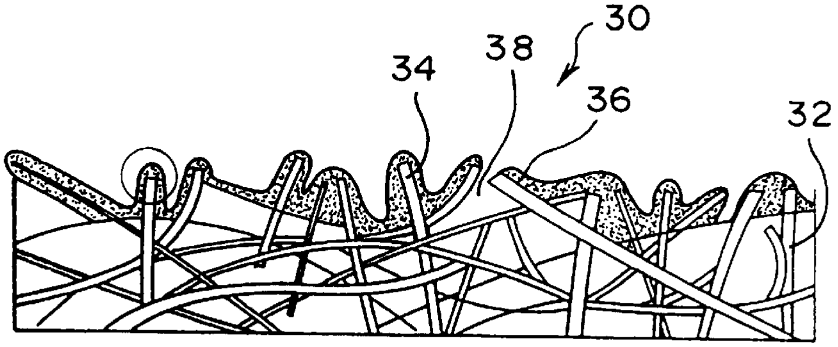
FIG. 3 is a schematic enlarged cross-sectional view of a fluorocarbon particle coated textile in accordance with the present invention.

Turning now to FIGS. 3 and 4, and initially primarily to FIG. 3, there may be seen generally at 30 a preferred embodiment of a fluorocarbon particle coated textile for use in an electrostatic printing machine in accordance with the present invention. As may be seen in FIG. 3 fluorocarbon particle coated textile 30 is comprised of fibers 32 having upper or surface portions 34 which are coated with fluorocarbon particles 36. As is depicted in FIG. 3, this coating of fluorocarbon particles 35 is discontinuous across the surface of the fluorocarbon particle coated textile 30. This insures that access to the textile interstices 38 will not be impeded. A suitable toner release agent, such as silicon oil, which is not specifically shown in the drawings, will be able to flow from the interstices 38 to the fuser roll of an electrostatic printing machine which is also not specifically shown. Additionally, the openings from the interstices 38 to the surface of the fluorocarbon particle coated textile 30 will be sufficient in both size and number to allow the collection and the storage of toner particles removed from the fuser roll by contact between the fluorocarbon particle coated textile 30 and the fuser roll of an electrostatic printing machine.

In accordance with the present invention there is provided in one aspect, a fluorocarbon particle coated textile product 30 weighing in the range of 15 to 6000 grams/square meter with a PTFE particulate coating weighing in the range of 10 to 100 grams/square meter. The textile may be produced by weaving or more typically by needle punching, thermal bonding, or hydroentangling. The PTFE particles 36 are adhered directly to the textile's fibers 34 through either chemical binding, mechanical bonding, or fusing. The adherence method is dependant upon the type of fluorocarbon suspension used as well as the processing temperature and thermal residence time. As discussed previously, these fluorocarbon particles 36 need not be a microscopically continuous structure to serve the intended purposes.

The base textile can be produced in several different ways such as weaving, non-woven needlepunching, non-woven thermal bonding, and non-woven hydroentanglement. These processes are well known to those skilled in the art. The fibers 32 of these textiles preferably are aramid, polyester, or a blend of aramid and polyester. The linear density of these fibers 32 range between 0.5 denier and 20 denier, preferably between 0.5 denier and 7 denier. The textiles' area weight is typically between 15 and 6000 grams per square meter (gsm). The preferred weight of needle felts ranges from 200 to 6000 gsm; of thermal bonded material ranges from 15 to 45 gsm; and of hydroentangled material ranges from 15 to 75 gsm. The textiles' thickness is typically between 0.040 mm and 30 mm. The preferred thickness of needle felts ranges from 1 mm to 30 mm; of thermal bonded materials ranges from 0.040 mm to 0.300 mm; and of hydroentangled material ranges from 0.040 mm to 0.400 mm.

The fluorocarbon particle coated textile 30 in accordance with the present invention is produced by applying to the textile fabric one of many commercially available aqueous PTFE particulate suspensions such as the PTFE resin sold by E. I. DuPont De Nemours under the trade name Teflon PTFE B or such as the PTFE/Acrylic sold by Lyons Coatings Incorporated under the trade name T-31. These suspensions can be applied to the textile in numerous methods. Two suitable methods are: 1) dipping the textile into a bath which contains the Teflon PTFE B suspension and 2) processing the T-31 suspension into a foam which is spread onto, and then scraped off of the textile's surface. The amount applied to the textile depends upon the user's requirements. Typical amounts range from 10 to 200 grams per square meter, with a preferred amount being 10 to 60 grams per square meter. The application of these suspensions is followed by dewatering of the coated textile via squeeze rolling and heating the textile. The heat and pressure of the dewatering step effectively affixes the PTFE particles 36 to the surface of the individual fibers 34 of the textile. It is important to note that the heat required to adequately affix the PTFE particles to the textile's fiber can be well below their sintering or melting temperatures of 323° C. or 337° C. respectively. Recommended drying temperatures are between 150° to 250° C., with a thermal residence time sufficient to drive off the free water.

These fluorocarbon particle coated textiles 30 are then slit and diecut into a size suitable for supplying oil to a fuser apparatus in an electrophotographic or electrostatic printing machine. These sizes range from 250 mm×3 mm to 50000 mm×1000 mm (Length×Width). Typically the next step is to impregnate the textile with a toner release fluid such as silicone oil. Most commonly silicone oil with a viscosity between the range of 50 and 100,000 centistoke is utilized as the tone release agent.

The fluorocarbon particle coated textiles 30 are sometimes utilized in a dry fashion as fuser cleaners or as gasketing devices in an electrophotographic or electrostatic printing machine. The gasketing/bearing application is particularly advantageous in the areas of photoreceptor/photoreceptor housing and lends itself well to a fluorocarbon particle coated textile due to the relatively low priced, low friction textile which is the result of the application of the fluorocarbon coating to the textile, as described above.

EXAMPLES

1) An Aramid needle felt was produced with 0.9 denier Nomex to a thickness of 2.3 mm and with an area weight of 400 grams/square meter. The needle felt was heat-set at 210° C. This needle felt was then surface coated with 25 grams per square meter of Lyons type T-31 PTFE coating via aerating the T-31 to a 5 to 1 (air to T-31) blow ratio, spreading the aerated T-31 foam onto the felt's top surface, and then doctoring or scraping the foam off the felt surface within 1 to 2 seconds of initial application. The coating was then dried using a convection oven set at 177° C. for 2 Minutes. This fluorocarbon particle coated textile 30 was then slit to 35.5 mm wide and cut to 1143 mm long. The coated textile 30 was then used in the fashion in which a non-coated textile would be used to produce a part which delivers silicone oil to a photocopier fuser roll. The coated textile was adhered to a tube shaped porous ceramic core or similar support. Required plastic mounting hardware was adhered to both sides of the textile/ceramic assembly. The textile/ceramic/plastic assembly was impregnated with 80 grams of 60,000 centistoke Dow 200 silicone oil via pressure injection through the center of porous ceramic core. The assembly was then oiled with 12 grams of 60,000 centistoke Dow 200 silicone oil via pressure injection through a perforated manifold onto the surface of the fluorocarbon particle coated textile, generally at 30 as seen in FIG. 3.

2) An Aramid needle felt was produced with 2.0 denier Nomex to a thickness of 2.3 mm and with an area weight of 390 grams/square meter. The needle felt construction included a polyester scrim as a reinforcement substrate and the final needle felt was heat-set at 210° C. This needle felt was then surface coated with 16 to 34 grams per square meter of Lyons type T-31 PTFE coating via aerating the T-31 to a 5 to 1 (air to T-31) blow ratio, spreading the aerated T-31 foam onto the felt's top surface, and then doctoring or scraping the foam off the felt surface within 1 to 2 seconds of initial application. The coating was then dried using a convection oven set at 177° C. for 2 minutes. This fluorocarbon particle coated textile 30 was then ready for slitting, die cutting, and oil impregnation to form the end product(s) as described above.

Fluorocarbon particle coated textiles 30 made in accordance with present invention, as recited in example 1 and 2 above, proved to have oil flow rates much closer to traditionally utilized uncoated textiles than to the prior art PTFE membrane coated textiles. A test in which 10,000 centistoke coil was permeated through various textiles using a vacuum pull of 5" Hg showed uncoated traditional needle felt textiles to have an average oil flow rate of 7.3 grams/minute. A PTFE membrane coated needle felt textile displayed a very restricted flow of 0.2 grams/minute. The fluorocarbon particle coated needle felts 30 of example 1 and 2 displayed an average oil flow rate of 5.3 grams/minute. This is clearly much more comparable to the oil flow rate for uncoated textiles than is the flow rate through the prior art PTFE membrane coated textiles.

In accordance with the present invention, the fluorocarbon particle coated textile roller assembly produced through example 1 was installed into a Kodak series 2100 photocopy machine. The average life of the prior art uncoated rollers is in the range of 400,000 to 600,000 copies. The life of the uncoated roller is typically ended through contamination build-up on the roller's surface which in turn leads to premature blockage of oil delivery from the textile to the fuser. The fluorocarbon particle coated textile 30, applied to a roller assembly as described in example 1 lasted 1,700,000 copies and 2,300,000 copies in two separate machine testings prior to blockage of oil delivery through contamination build-up. Thus, the fluorocarbon particle coated textile 30 achieved three to four times longer life than the average life of the prior art uncoated textile roller. This life improvement can be attributed to lower contamination build up on the textile's surface. This is achieved without the cost and oil flow performance drawbacks of the prior art PTFE membrane coated textiles.

An additional benefit of the fluorocarbon particle coated textiles 30 of the present invention is that the toner particle pick-up properties are greater than in the prior art PTFE membrane laminated textiles. Although the toner particle pick-up of an fluorocarbon particle coated textile 30 may be somewhat lower than uncoated textiles, the advantage of low fiber shedding which is possessed by the fluorocarbon particle coated textiles of the present invention outweighs this slightly reduced toner particle pick-up property when compared to prior art uncoated textiles such as textile 10 shown in FIG. 1.

While a preferred embodiment of a fluorocarbon particle coated textile for use in an electrostatic or electrophotographic printing machine in accordance with the present invention has been set forth fully and completely hereinabove, it will be apparent to one of skill in the art that various changes in, for example, the particular electrostatic printing machine, the type of photocopying being accomplished, the type of toner being used and the like could be made without departing from the true spirit and scope of the present invention which is accordingly to be limited only by the following claims.

What is claimed is:

1. A release agent delivery and particle capture device for a fuser system of an electrostatic printing machine comprising:

a support; and a textile fabric on said support, said textile fabric being formed by a plurality of textile fibers, said textile fibers including a plurality of textile fiber surface portions forming a surface of said textile fabric and a plurality of textile fabric interstices, said interstices extending into said textile fabric from said surface of said textile fabric, and a discontinuous coating of fluorocarbon particles on said surface portions of said textile fibers, said discontinuous coating of fluorocarbon particles providing unimpeded access between said textile fabric interstices and said surface of said textile fabric.

2. The device of claim 1 further including a toner release agent in said interstices.

3. The device of claim 1 wherein said textile fibers are an aramid and further wherein said discontinuous coating of said fluorocarbon particles is bonded directly to said textile surface portions of said textile fibers.

4. The device of claim 1 wherein said textile fibers are a polyester.

5. The device of claim 2 wherein said toner release agent is a silicone oil.

6. The device of claim 1 wherein said discontinuous coating of fluorocarbon particles is polytetrafluoroethylene.

7. The device of claim 6 wherein said discontinuous coating is applied to said surface portions of said textile fibers as a foam.

8. A method for the delivery of release agent and the capture of particles in a fuser system of an electrostatic printing machine including:

providing a textile fabric having a surface and a plurality of fabric interstices;

placing a discontinuous coating of fluorocarbon particles on said surface of said textile fabric;

allowing unimpeded access between said textile fabric surface and said plurality of fabric interstices through said discontinuous coating of fluorocarbon particles;

providing a support;

securing said textile fabric to said support;

impregnating said textile fabric with a release agent; and using said textile fabric for delivery of said release agent to a fuser roll and for capturing particles from the fuser roll by transferring said release agent from said interstices through said textile fabric surface to the fuser roll and by capturing said particles in said interstices, said release agent and said particles passing between said interstices and said textile fabric surface through said discontinuous coating of fluorocarbon particles.

* * * * *